W. T. JAMES.
SPEED CHANGING GEARING.
APPLICATION FILED JUNE 2, 1909.
1,064,736.
Patented June 17, 1913.
3 SHEETS—SHEET 1.
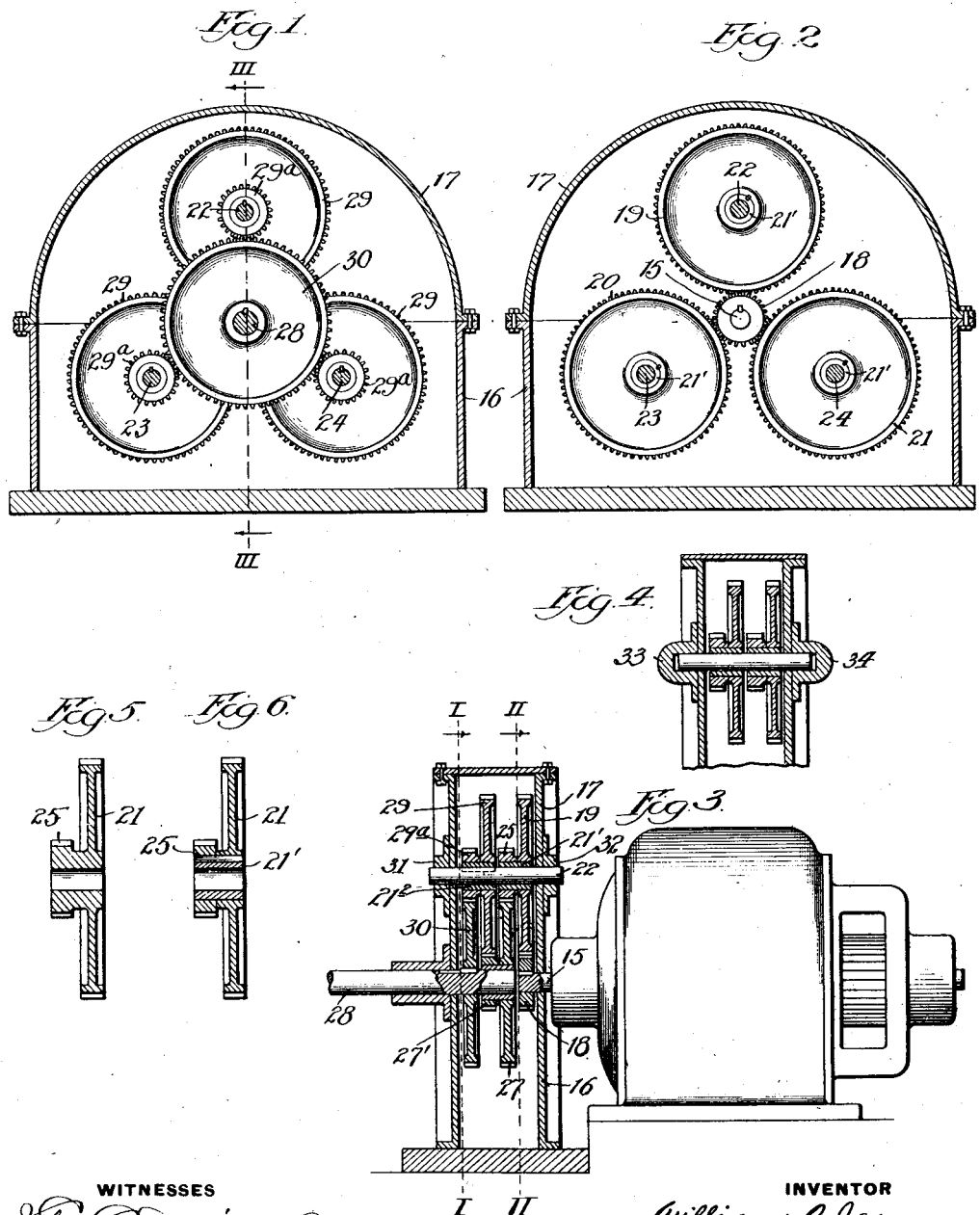

W. T. JAMES.
SPEED CHANGING GEARING.
APPLICATION FILED JUNE 2, 1909.
1,064,736.
Patented June 17, 1913.
3 SHEETS—SHEET 2.
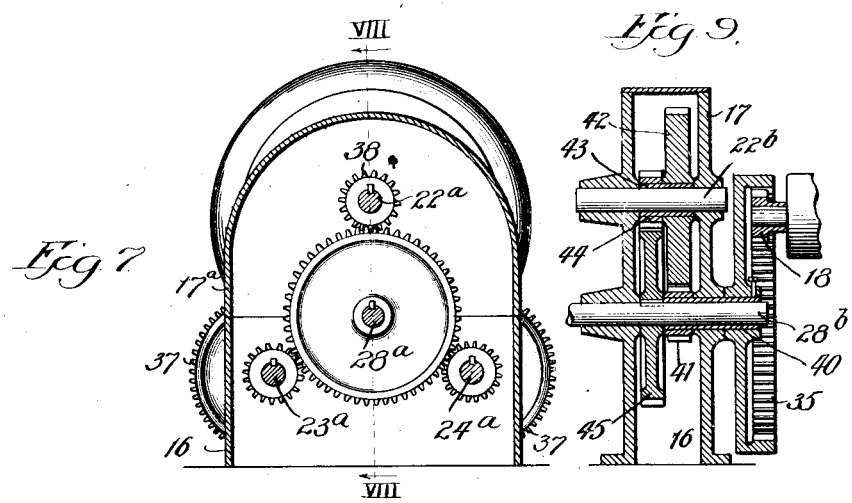
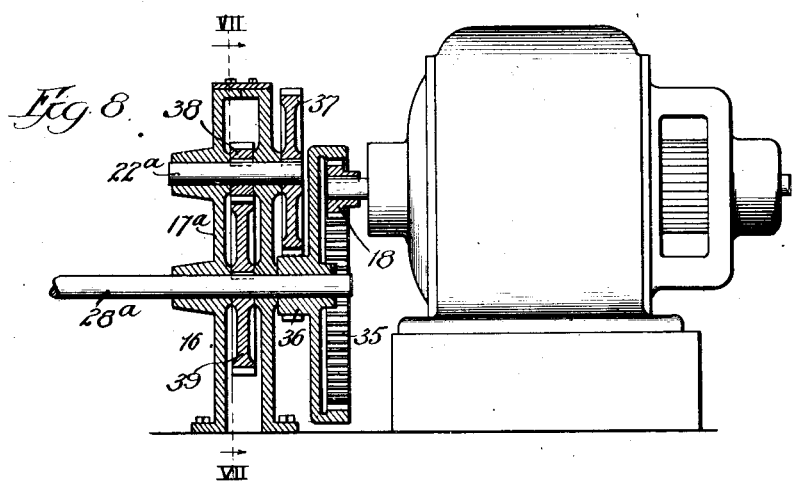
WITNESSES
INVENTOR
William T. James W. T. JAMES.
SPEED CHANGING GEARING.
APPLICATION FILED JUNE 2, 1909.
1,064,736.
Patented June 17, 1913.
3 SHEETS—SHEET 3.
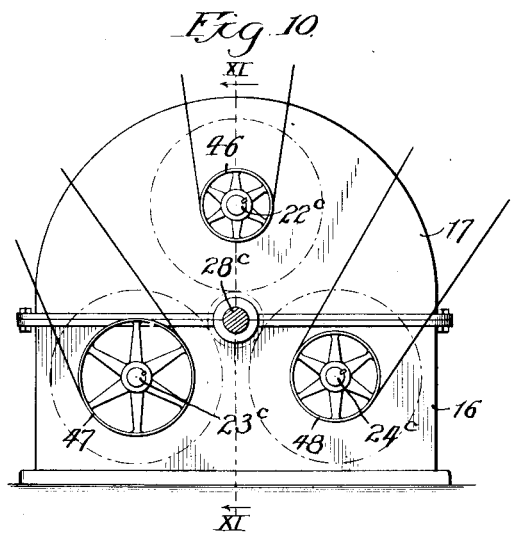
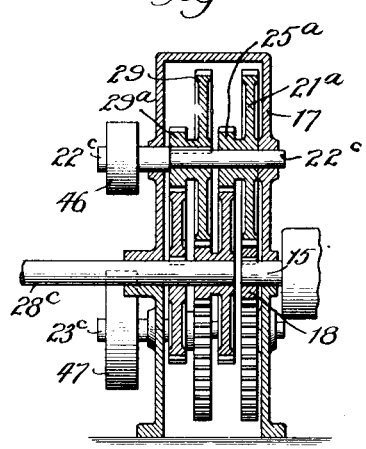
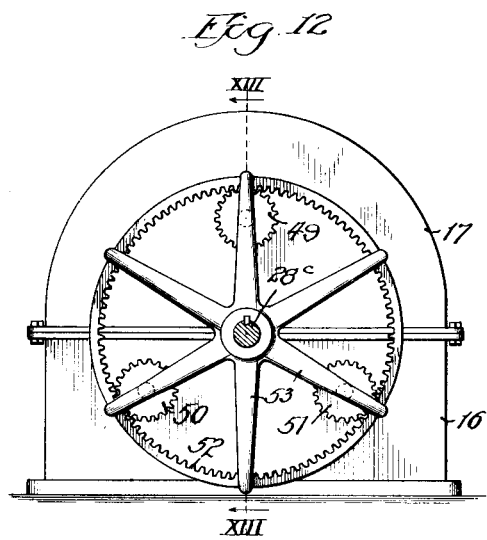
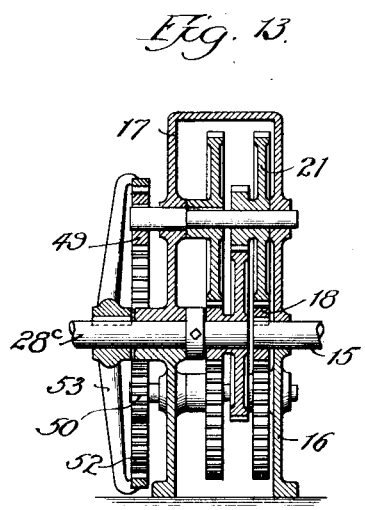
WITNESSES
INVENTOR

UNITED STATES PATENT OFFICE.

WILLIAM THOMAS JAMES, OF CHICAGO, ILLINOIS.

SPEED-CHANGING GEARING.

1,064,736.  Specification of Letters Patent.  Patented June 17, 1913.

Application filed June 2, 1909. Serial No. 499,779.

*To all whom it may concern:*

Be it known that I, WILLIAM THOMAS JAMES, a citizen of the United States, residing at Chicago, in the county of Cook and State of Illinois, have invented certain new and useful Improvements in Speed-Changing Gearing, of which the following is a specification.

My invention relates to power transmission mechanism and is especially adaptable to that class of apparatus wherein a machine is operated from a relatively slow moving drive whose prime mover is a high speed motor, and has for its principal object the provision of an improved form of speed changing gears adaptable either for stepping up from a slow speed motor to a machine which is most economically operated at high speed, as, for example, certain types of lathes and drills, or for stepping down the speed as, for example, in conveyers or elevators of certain types which are necessarily slowly driven but can be most economically operated from a small high speed high potential electric motor.

Further objects of my invention are the provision of a speed changing gearing which will be stiffer in construction and the parts of which will be less likely to become out of alinement in operation, which will have less friction and so will be more economical in operation than the speed changing gearing with which I am acquainted, which may be more perfectly lubricated and kept adjusted and in good running order, which is highly concentrated in form and occupies a minimum of space in the engine or dynamo room, one wherein the size of the units may be greatly reduced and proportionately to the number of units employed and which may be easily, inexpensively and rapidly manufactured, assembled, adjusted and repaired when necessary, and to provide a construction of the character described wherein power may be taken from a shaft which is in axial alinement with a motor shaft or the like revolving at a different rate of speed, or from one or more members of the gearing together with such other objects as will hereinafter appear.

To attain the foregoing objects as well as additional benefits and advantages, which will occur to those skilled in the art to which my invention relates, I have provided the construction illustrated in the accompanying drawings, wherein—

Figure 1 is an elevation taken on the line I—I of the gearing illustrated in Fig. 3; Fig. 2 is a view, partly in section, taken on the line II—II of Fig. 3; Fig. 3 is a sectional elevation taken on the line III—III of Fig. 1; Fig. 4 is a detailed sectional view of a modified form of stationary shaft support; Fig. 5 is an enlarged view of the form of combined gear and pinion used by me. Fig. 6 is an enlarged view of a separate gear and pinion mounted upon a sleeve; Fig. 7 is a view taken on the line VII—VII of Fig. 8 illustrative of a modified form of construction wherein the master pinion instead of driving an external gear as shown in the preceding figures is arranged to drive an annular gear internally; Fig. 8 is a sectional view taken on the line VIII—VIII of Fig. 7; Fig. 9 illustrates a further modification of the type gear shown in Figs. 7 and 8; Fig. 10 is an end view of the adaptation of my improved gear illustrated in Fig. 11; Fig. 11 is a sectional view taken on the line XI—XI of Fig. 10; Fig. 12 is an end elevation of the type gear illustrated in Fig. 13, and Fig. 13 is a sectional view (taken on the line XIII—XIII of Fig. 12) wherein I illustrate an exemplification of my improved gear adapted to drive an annular gear carried upon a reduction shaft by means of a spider.

Referring now more particularly to Figs. 1, 2 and 3 it will be noted that in carrying out my invention I mount about the armature shaft, 15, a suitable gear box, 16, 17 which is preferably formed in halves to the end that the top member, 17, may be removed for the inspection of the gears, renewal of pinions, etc., as may be desired, as well as the ready assemblage of the mechanism. It will be observed that the master pinion, 18, on the shaft, 15, is adapted to drive a plurality of gears, 19, 20 and 21, which are respectively keyed upon sleeves 21' and rotatably mounted on shafts 22, 23 and 24 and are provided with pinions, 25 (see Fig. 6), adapted to drive a gear, 27, with pinion, 27', the gear and the pinion being rotatably carried upon the reduction shaft, 28, and the pinion 27' in turn driving similar gears, 29, which may be rotatably mounted upon the said shaft, 22 (or keyed thereupon if it be desired to transmit power from the shaft, 22, as indicated in Fig. 10). The gears, 29, drive by means of the pinions, 29ª, the gear, 30, (see Fig. 3) keyed to the said reduction shaft, 28.

While I prefer to mount the gears and pinions on a sleeve, 21′, as most clearly to be seen from Fig. 6, it is obvious that they may be made integral as shown in Fig. 5.

For the sake of clarity the shaft, 22, and the gears and pinions carried thereby, only, have been shown in Fig. 3, though it will be understood that the shafts, 23 and 24, being provided with the same kinds and sizes of gears and pinions, are in all respects duplicates of the parts here shown.

It will be apparent that by means of the construction here illustrated, I am enabled at all times to drive from a plurality of pinion teeth, and thereby utilize gears of much smaller diameter than were I to drive but a single gear, and furthermore that inasmuch as but a portion of the power is transmitted through any one gear, much less strain and torque is suffered by any such gear than were the entire power transmitted through one gear, which enables me to greatly reduce not only the size of the individual gears but also the space required for their mounting, and furthermore inasmuch as they are all mounted on common shafts and the said shafts about a common axis the danger of radial displacement is largely minimized, unnecessary friction losses avoided and a device more economical in the consumption of power produced.

From an inspection of Figs. 3 and 4 it may be seen that in such cases as it may be thought desirable to take power from the shafts 22, 23 or 24, (see Fig. 10) they may be provided with plain bearings as indicated at 31, 32, carried by the casing 16, 17, (see Fig. 3) but where such be not the case I prefer to provide the ends of these shafts with caps, 33, 34, having a driven fit thereon and faced to contact tightly with the sides of the casing in order to make the casing as oil tight as possible to prevent leakage or the entrance of foreign matter.

Referring now more particularly to Figs. 7 and 8 I here illustrate a form of gearing which is similar to that of Figs. 1 to 3 save that the power is transmitted from the pinion, 18, to an internal gear, 35, which is rotatably mounted on the reduction shaft, 28ª, and provided with a pinion, 36, driving a gear, 37, keyed to the shaft, 22ª, which is mounted in suitable bearings in the casing, 16, 17ª and has keyed thereon a pinion, 38, which drives a gear, 39, keyed to said shaft, 28ª. The advantage of this type of construction which I find useful in some cases is that it may be made even more compact than that illustrated in Figs. 1 to 3 and furthermore that power may be transmitted from the shaft, 28ª, and also from the gear, 37, where desired. In Fig. 9 I have illustrated a further modification of the gears heretofore described, wherein the pinion, 18, drives an annular gear, (as illustrated in Fig. 8), but the said gear is keyed upon a sleeve, 40, and rotatably mounted on the shaft, 28ᵇ, carried in said sleeve in the casing, 16, 17, and at the opposite end of said sleeve is mounted a pinion, 41, driving a gear, 42, mounted upon a sleeve, 43, which carries a pinion, 44, both the gear and the pinion being mounted upon a shaft, 22ᵇ, supported by the said casing, the said pinion, 44, driving a gear, 45, which is keyed to the reduction shaft, 28ᵇ.

On viewing Figs. 10 and 11 it will be observed that the structure here illustrated is similar in all respects to that of Figs. 1, 2 and 3, save that the gear, 21ª, and pinion, 25ª, and the gear, 29, and pinion, 29ª, instead of being mounted upon the sleeves 21¹ and 21², are respectively made integral and furthermore that the shafts, 22ᶜ, 23ᶜ, and 24ᶜ, are provided with pulleys, 46, 47 and 48, of varying dimensions whereby various reductions of speed may be obtained, as well as that of the main reducing shaft, 28ᶜ.

Referring now more especially to Figs. 12 and 13 it will be noted that in this exemplification of my invention, the pinions instead of being mounted within the casing, 16, 17 on the sleeve 21², are mounted exteriorly thereof as indicated at 49, 50, 51, and drive the internal gear 52, carried by the spider, 53, which is keyed to the reduction shaft, 28ᶜ, thereby reducing the strain upon each of the said pinions to a minimum.

While all the forms of my improved speed changing mechanism are adaptable either for stepping up or stepping down the speed of the power delivery shaft, the construction illustrated in Figs. 12 and 13 I find to be especially adapted for delivering power at a very low speed, say 10 R. P. M., from a high speed armature shaft of say 1200 R. P. M.

It will be observed that by varying the size, number and order of the series of gears and pinions practically any desired speed of the shaft, 28, may be obtained, and that this may be encompassed within a small space.

Having thus described my invention and illustrated its use what I claim as new and desire to secure by Letters Patent is the following:—

1. In a speed changing gear, a housing, a drive shaft projecting into the housing, a drive gear thereon, three driven shafts spaced about the drive shaft and projecting from the front of the housing, a fourth driven shaft mounted in the housing in alinement with the drive shaft, and also projecting from the front of the housing, a gear revoluble on each of the three driven shafts meshing with the drive gear, a pinion coaxial with each of the gears on the three driven shafts and mounted to move therewith, a fifth gear mounted revolubly on the inner end of the fourth driven shaft meshing with the last mentioned pinions, a pinion coaxial with said fifth gear and mounted to move therewith, coöperating means outside of said housing coöperable with the pinions of the three driven shafts, and a connection between said coöperative means and the pinion said means being coaxial with said fifth gear.

2. In speed changing gearing, a drive gear, three driven gears meshing therewith, a pinion co-axial with and movable with each of said driven gears, an internal gear meshing with said pinions and driven thereby and having an axis in alinement with that of the drive gear, a housing inclosing said drive gear and driven gears, said housing being divided along the line of the axis of the driven and driving shafts, said internal gear and coöperating pinions being arranged outside said housing, the shafts of the three driven gears projecting from the front of the housing and spaced about the drive shaft, and a driven shaft on which the internal gear is fixedly secured and on which said drive gear is revolubly mounted.

3. The combination, in speed changing gearing, of a housing, a driven shaft mounted in the housing and projecting therefrom, a drive gear in the housing mounted revolubly on the driven shaft, three driven shafts in the housing spaced about the first mentioned driven shaft and projecting from said housing, a driven gear in the housing on each of the three driven shafts and meshing with the drive gear, intermediate gearing, a pinion secured on each of the last mentioned driven shafts outside of said housing and coaxial with each of the said three gears, and an internal gear non-revolubly secured on the first mentioned driven shaft outside of said housing and meshing with the said three pinions.

4. In combination in speed changing gearing, a housing, a drive shaft projecting into the housing, a drive gear thereon, three driven shafts spaced about the drive shaft and projecting from the front of the housing, a fourth driven shaft mounted in the housing in alinement with the drive shaft and also projecting from the front of the housing, a gear revoluble on each of the three driven shafts meshing with the drive gear, a pinion co-axial with each of the gears on the three driven shafts and mounted to move therewith, a fifth gear mounted revolubly on the inner end of the fourth driven shaft meshing with the last mentioned pinions, a pinion co-axial with said fifth gear and mounted to move therewith, a gear secured on each of the three driven shafts and meshing with said last mentioned pinion, a pinion secured to the outer end of each of the three driven shafts, and an internal gear secured to the outer end of said fourth driven shaft outside of said housing and meshing with the three last mentioned pinions.

5. In combination, in speed changing gearing, a housing divided into two parts, a shaft having its axis located on the line of division between the parts of the housing, one of the parts of the housing being provided with externally extending integral bearings for said shaft, a master gear mounted on the shaft, a plurality of shafts mounted in the housing, closed bearings for the ends of said shafts, a driven gear carried by each of said last shafts and meshing with the master gear, a pinion co-axial with and movable with each of said driven gears, a driven shaft in alinement with said first mentioned shaft also located on the line of division between the parts of the housing, a drive gear meshing with the said pinions and an internal gear secured to the outer end of the driven shaft, outside of said housing.

6. In combination, in speed changing gearing, a housing divided into two parts, a shaft having its axis located on the line of division between the parts of the housing, a master gear mounted on the shaft, a plurality of shafts mounted in the housing, a driven gear carried by each of said last shafts and meshing with the master gear, a pinion co-axial with and movable with each of said driven gears, a driven shaft in alinement with said first mentioned shaft also located on the line of division between the parts of the housing, and a drive gear meshing with the said pinions, said housing being provided with extended closed bearings for said plurality of shafts, and one of the parts of said housing being provided with extended integral bearings for the two shafts located on the line of division between the parts of the housing.

In testimony whereof I have hereunto signed my name in the presence of the subscribed witnesses.

WILLIAM THOMAS JAMES.

Witnesses:
PAUL CARPENTER,
DONALD C. WILLIAMS.